June 15, 1954

R. L. WEIMER 2,680,947

CONTROL SYSTEM FOR LAWN MOWERS

Filed Jan. 2, 1951

Robert L. Weimer INVENTOR.

June 15, 1954     R. L. WEIMER     2,680,947
CONTROL SYSTEM FOR LAWN MOWERS
Filed Jan. 2, 1951     3 Sheets-Sheet 2
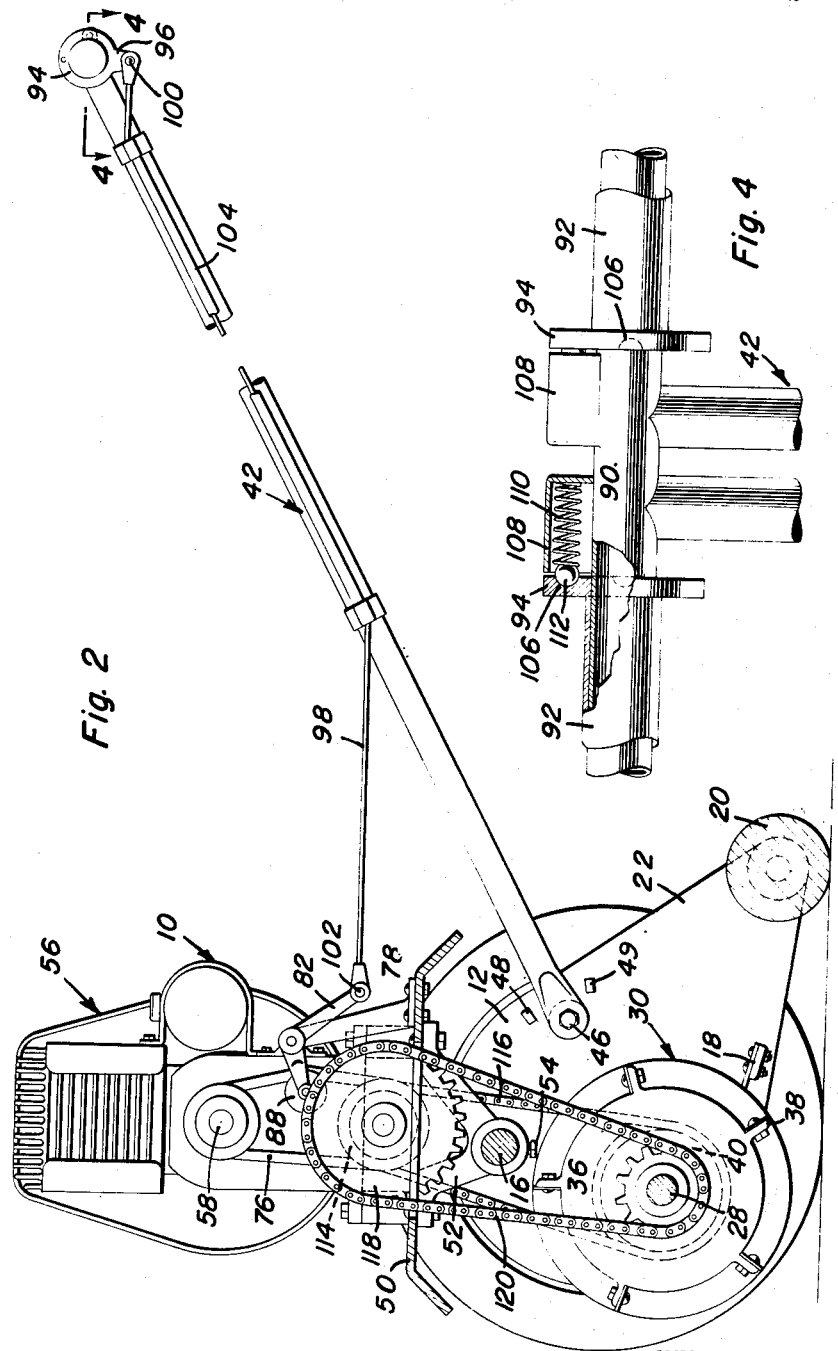
Robert L. Weimer INVENTOR.
BY *Attorneys*

June 15, 1954
R. L. WEIMER
2,680,947
CONTROL SYSTEM FOR LAWN MOWERS
Filed Jan. 2, 1951
3 Sheets-Sheet 3
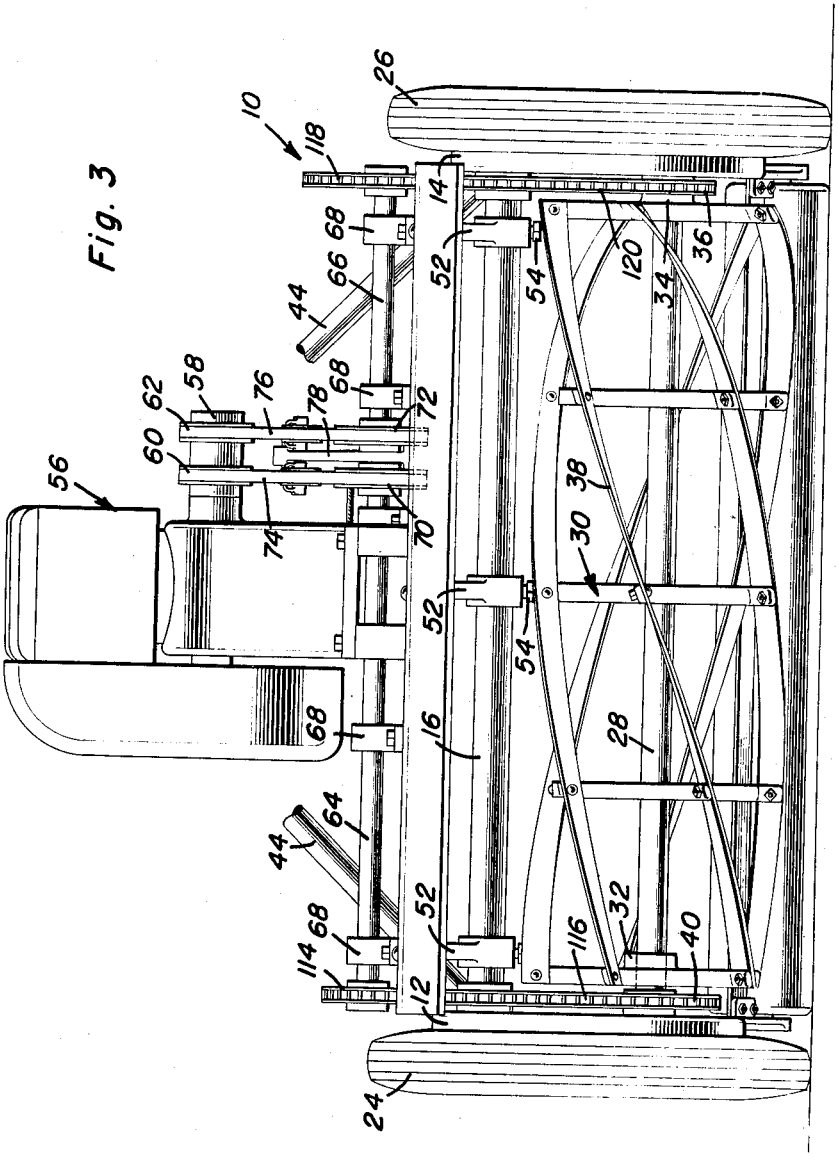
Robert L. Weimer
INVENTOR.

Patented June 15, 1954

2,680,947

UNITED STATES PATENT OFFICE 2,680,947

CONTROL SYSTEM FOR LAWN MOWERS

Robert L. Weimer, Cumberland, Md.

Application January 2, 1951, Serial No. 203,831

1 Claim. (Cl. 56—26)

This invention relates generally to new and useful improvements in power driven lawn mowers, and more particularly pertains to a machine of this character wherein the traction wheels and the cutter means thereof may be selectively and independently driven.

The primary object of this invention is to enable the operator of a lawn mower to selectively drive the ground wheels thereof and also to selectively drive the cutting reel thereof from a single prime mover.

Another important object of this invention is to provide means for realizing the above objects, which may be incorporated in existing hand driven lawn mowers without necessitating extensive changes in such machines before incorporating the principles of this invention therewith, so as to render this invention more readily available to the public at a lower cost.

Still another object of this invention is to prevent cut grass or other foreign matter from interfering with the operation of the machine and to reduce the possibility of injury being inflicted by the machine.

A further important object of this invention is to provide a machine of this character which may be efficaciously controlled by the operator and which will drive the cutting reel and the traction wheels in such a manner that slippage may occur so as to prevent damage to the prime mover or the cutting reel, as for example, when a stick or rock is caught between the cutting reel and the bed knife.

A meritorious feature of the invention resides in the provision of the aligned countershafts which are driven at their adjacent ends so that the remote ends of the same may be drivingly connected to the wheel driving shaft and the cutting reel at positions closely adjacent the traction wheels.

Another important feature of the present invention resides in the provision of a shield mounted on the frame below the countershafts and the prime mover to prevent cut grass or foreign matter gaining access to these parts, and for reducing the possibility of injury being inflicted by the machine.

Yet another important feature of the present invention resides in the means for driving the countershafts from the drive shaft of the prime mover, whereby power is delivered from a short prime mover drive shaft to the cutting reel and the traction wheel driving shaft at positions adjacent the opposite sides of the machine.

A final important feature to be specifically enumerated herein resides in the drive belt tensioning means, and the hand grips on the control handle for actuating the same.

These, together with ancillary objects and features of the invention which will become apparent as the following description proceeds, are attained by the present invention, a preferred embodiment of which has been illustrated by way of example only in the accompanying drawings, wherein:

Figure 2 is a longitudinal sectional view taken upon the plane of the section line 2—2 of Figure 1, certain concealed portions of the machine being illustrated in dotted outline;

Figure 3 is a front elevational view of the lawn mower, portions of the same being broken away; and Figure 4 is an enlarged detail of the means provided on the handle for actuating the belt tensioning means, portions of the same being broken away and shown in section.

Figure 1:
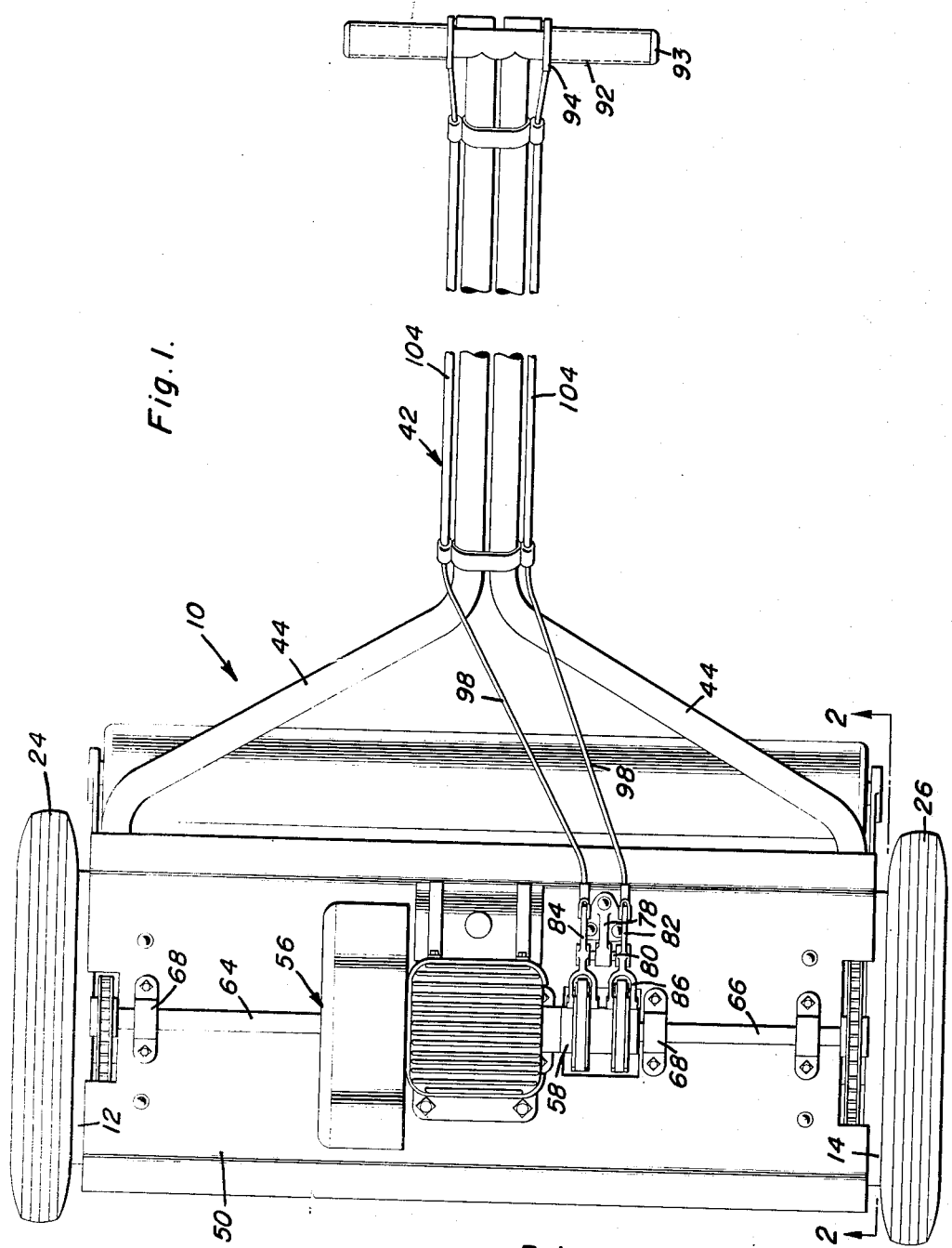
Figure 1 is a top plan view of the present invention.

Reference is now made more specifically to the accompanying drawings, wherein the numerals designate similar parts throughout the various views, and in which the numeral 10 designates the improved lawn mower generally.

The lawn mower 10 comprises a frame including the side plates 12 and 14, which are connected by the brace rod 16, and have the conventional bed knife 18 connected therebetween. In addition, the usual roller 20 is disposed rearwardly of the bed knife 18 and is journaled at its opposite ends in the rearwardly extending portions 22 of the side plates, as best shown in Figure 2.

Associated in the conventional manner on the opposite sides of the side plates 12 and 14 are the wheel assemblies which include the traction wheels 24 and 26. A wheel driving shaft 28 is journaled through the side plates and has its opposite ends drivingly connected to the traction wheels 24 and 26 in any suitable manner, not shown, it being understood that the wheels may be simply fixed to the opposite ends of the shaft 28, but it is preferred that the opposite ends of the shaft be provided with one-way driving pinions, not shown, that mesh with an internal gear, not shown, fixed to the wheels 24 and 26 in the conventional manner all as disclosed in U. S. Patent No. 1,858,618 to J. A. E. Carlson.

A cutting reel designated generally at 30 is journaled by hubs 32 and 34 on the shaft 28. The hub 34 of the cutting reel 30 is provided with a toothed sprocket 36 by means of which the cutting reel 30 may be driven. It will be noted that the cutting reel 30 includes spiraled blades 38 which are disposed to cooperate with the bed knife 18 in the usual manner to cut grass.

The wheel driving shaft 28 is provided with a toothed sprocket 40, by means of which the shaft 28 may be driven, it being noted that the cutting reel 30 may be rotated independently of the shaft 28, so that the traction wheels 24 and 26 may be driven simultaneously with the driving of the cutting reel 30, or the traction wheels may be driven when the cutting reel 30 is stationary, and vice versa.

The lawn mower 10 is provided with a control handle designated generally at 42 that includes a pair of downwardly diverging portions 44, the lower ends of which are pivotally connected to the side plates 12 and 14 as at 46. Pivotal movement of the handle 42 relative to the side plates 12 and 14 is limited by stop lugs 48, 49 carried by the plates 12 and 14 and disposed in the path of movement of the portions 44.

A protecting shield or platform 50 is provided that is disposed above the cutting reel 30, the shield 50 being adjustably supported by means of brackets 52. The lower ends of the brackets 52 pivotally embrace the brace rod 16, and are adjustably secured thereto by means of set screws 54, whereby the vertical height of the shield 50 may be adjusted.

A prime mover, designated generally at 56, is mounted securely upon the central portion of the shield 50, the prime mover 56 including a drive shaft 58 that has a pair of pulleys 60 and 62 fixed thereto. A pair of aligned countershafts 64 and 66 are journaled in suitable bearings 68 fixed to the top of the shield 50, the adjacent ends of the countershafts 64 and 66 having pulleys 70 and 72 fixed thereto, respectively. A flexible drive belt 74 is entrained loosely over the pulleys 60 and 70 so that a driving connection may be provided between the shaft 58 and the countershaft 64, and in a similar manner a drive belt 76 is loosely entrained over the pulleys 62 and 72, so that a driving connection may be established between the shaft 58 and the countershaft 66. It will be understood that the belts 74 and 76 are sufficiently loose, so that if the same are not externally tensioned, rotation of the shaft 58 will not impart rotation to either of the countershafts 64 and 66.

Means is provided for selectively tensioning the drive belts 74 and 76. Such means include an upstanding bracket 78 mounted on the shield 50 adjacent the adjacent ends of the countershafts 64 and 66. At its upper end, the bracket 78 carries a transverse pin 80 upon the opposite ends of which are journaled bell cranks 82 and 84. One end of each of the bell cranks 82 and 84 is forked as at 86 (see Figure 1) and has journaled therein an idler roller, the arrangement being such that the forked end of the bell crank together with the idler roller 88 surrounds one of the drive belts with the idler roller 88 engaging the inner face of the drive belt. As will be readily appreciated upon reference to Figure 2, it will be seen that anticlockwise movement of the bell crank 82 will cause the idler roller 88 to bear against and tension the belt 76, so that rotation of the drive shaft 58 will impart rotation to the countershaft 66, it being understood that a similar relation holds true with respect to the bell crank 84 and the drive belt 74.

Means is provided for actuating the bell cranks 82 and 84, such means including a cross member 90 fixed to the upper end of the handle 42. Upon the opposite ends of the cross member 90 is journaled a pair of hand grips or sleeves 92, the hand grips 92 being disposed so as to be readily gripped by the hands of the operator, and enlarged ends 93 are provided on the opposite ends of the cross member to retain the grips 92 thereon to prevent endwise movement of the hand grips 92 on the cross member 90. Each of the hand grips 92 is provided with a radially extending annular flange 94 which includes a depending portion 96. An elongated flexible element 98 is connected to each of the depending portions 96 and to the ends of the bell cranks 82 and 84 remote from the idler roller 88, as at 100 and 102, respectively. A pair of tubular housings or guides 104 are secured to the opposite sides of the handle 42, and the elements 98 are extended through the tubular housings 104, as clearly shown in Figures 1 and 2. As thus far described, it will be apparent that anticlockwise movement of the hand grips 92 will impart anticlockwise movement of the bell cranks, as seen in Figure 2, to tension the idler roller 88 against the drive belts, whereby the bell cranks 82 and 84 may be selectively actuated to tension the drive belts 74 and 76. In order to retain the hand grips 92 in adjusted positions, each of the flanges 94 is provided with a plurality of circumferentially spaced recesses 106, and the cross member 90 carries a pair of housings 108, in each of which housings 108 is disposed a compression spring 110 that urges a ball 112 towards the face of the flange 94 having the recesses 106 therein, the arrangement being such that engagement of the ball 112 in one of the recesses 106 tends to prevent rotation of the associated hand grip 92, however, such retention may be overcome by exerting sufficient turning force to the hand grip 92 so as to release the ball 112 from one of the recesses 106. The hand grip 92 may then be rotated to a position in which another recess 106 is brought into alignment with the housing 108, whereupon the spring 110 urges the ball 112 into the other recess 106 to retain the hand grip 92 in the second position.

In order to establish a driving connection between the countershaft 64 and the wheel driving shaft 28, the end of the countershaft remote from the countershaft 66 is provided with a sprocket 114, and a drive chain 116 is entrained over the sprocket 114 and the sprocket 40. In a similar manner, the countershaft 66 is provided with a sprocket 118 and a drive chain 120 is entrained over the sprockets 118 and 36 to drive the reel 30 from the countershaft 66.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

Drive mechanism comprising a motor adapted to be mounted on a frame of a lawn mower and including a drive shaft, a pair of coaxially aligned countershafts having journal bearings attachable to said frame, said countershafts having aligned spaced apart inner ends and remote outer ends, separate belt and pulley drives from said drive shaft to the inner ends of said countershafts, respectively, having normally slack belts adapted for tightening to operatively connect said drive shaft to said countershafts for drive of the countershafts by the drive shaft, drive means on the outer ends of said countershafts adapted to be operatively connected to a reel driving shaft and a wheel driving shaft of the lawn mower to drive the same by operation of the countershaft, belt tighteners attachable to said frame and operatively associated with said belts, respectively, to tighten the same, and means operatively connected to said tighteners for operating the same separately and simultaneously, selectively, and attachable to a handle of the lawn mower for operation at said handle.

References Cited in the file of this patent

UNITED STATES PATENTS

| Number | Name | Date |
|---|---|---|
| 1,048,499 | Caldwell | Dec. 31, 1912 |
| 1,858,618 | Carlson | May 17, 1932 |
| 2,055,724 | Irgens | Sept. 29, 1936 |
| 2,070,288 | Mack | Feb. 9, 1937 |
| 2,160,259 | Cooper | May 30, 1939 |
| 2,237,521 | Frazier | Apr. 8, 1941 |
| 2,247,333 | Funk | June 24, 1941 |
| 2,285,230 | Roberton | June 2, 1942 |
| 2,329,952 | Speiser | Sept. 21, 1943 |
| 2,453,819 | Smith | Nov. 16, 1948 |
| 2,547,695 | Eaglesfield et al. | Apr. 3, 1951 |
| 2,555,881 | Grangroth et al. | June 5, 1951 |